United States Patent
Baligh et al.

(10) Patent No.: US 10,448,285 B2
(45) Date of Patent: Oct. 15, 2019

(54) MOBILITY HANDLING IN ULTRA DENSE NETWORKS

(71) Applicants: Mohammadhadi Baligh, Ottawa (CA); Jianglei Ma, Ottawa (CA); Alireza Bayesteh, Ottawa (CA); Usa Vilaipornsawai, Nepean (CA); Yicheng Lin, Ottawa (CA); Keyvan Zarifi, Ottawa (CA)

(72) Inventors: Mohammadhadi Baligh, Ottawa (CA); Jianglei Ma, Ottawa (CA); Alireza Bayesteh, Ottawa (CA); Usa Vilaipornsawai, Nepean (CA); Yicheng Lin, Ottawa (CA); Keyvan Zarifi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 15/073,788

(22) Filed: Mar. 18, 2016

(65) Prior Publication Data

US 2017/0181041 A1    Jun. 22, 2017

Related U.S. Application Data

(60) Provisional application No. 62/270,734, filed on Dec. 22, 2015.

(51) Int. Cl.
*H04L 5/00* (2006.01)
*H04W 36/00* (2009.01)

(52) U.S. Cl.
CPC .... *H04W 36/0011* (2013.01); *H04W 36/0072* (2013.01); *H04L 5/0091* (2013.01)

(58) Field of Classification Search
CPC ................................................ H04W 36/0011
See application file for complete search history.

(56) References Cited

U.S. PATENT DOCUMENTS 9,385,792 B2    7/2016  Seo et al.
9,419,750 B2    8/2016  Roh et al.
(Continued)

FOREIGN PATENT DOCUMENTS

CN    102447524 A    5/2012
CN    102804897 A    11/2012
(Continued)

OTHER PUBLICATIONS

"5G: A Technology Vision", Huawei Technologies, Co., Ltd., 2013, http://www.huawei.com/5gwhitepaper/, pp. 1-16.
(Continued)

*Primary Examiner* — Redentor Pasia

(57) ABSTRACT

User Equipment (UE) mobility in Ultra Dense Networks (UDNs) is based on communication signal layers, which could include respective data streams in an Orthogonal Frequency Division Multiplexing (OFDM) domain, a code domain using respective codebooks, and/or a spatial domain, for example. A UE uses candidate layer decoding parameters in applying layer-based decoding to communication signals that it received from network nodes. Layers could be allocated to UEs and transition between network nodes as UEs move between different network service areas. Layers could instead be allocated to network nodes. Layer-based decoding provides for UE mobility without requiring explicit handover processing every time a UE moves between different service areas.

19 Claims, 6 Drawing Sheets

(56) References Cited

U.S. PATENT DOCUMENTS

| | | | |
|---|---|---|---|
| 9,935,757 | B2 | 4/2018 | Chung et al. |
| 10,136,418 | B2 | 11/2018 | Roh et al. |
| 10,334,569 | B2 | 6/2019 | Roh et al. |
| 2007/0265016 | A1 | 11/2007 | Kahtava et al. |
| 2010/0034310 | A1* | 2/2010 | Nam .......... H04L 1/0606 375/267 |
| 2010/0195594 | A1 | 8/2010 | Seo et al. |
| 2010/0273492 | A1* | 10/2010 | Liu .......... H04B 7/022 455/446 |
| 2010/0275083 | A1 | 10/2010 | Nam et al. |
| 2010/0278034 | A9 | 11/2010 | Laroia et al. |
| 2010/0322132 | A1 | 12/2010 | Ramakrishna et al. |
| 2011/0085503 | A1 | 4/2011 | Nam et al. |
| 2011/0103324 | A1 | 5/2011 | Nam et al. |
| 2011/0110219 | A1 | 5/2011 | Nam et al. |
| 2011/0110449 | A1 | 5/2011 | Ramprashad et al. |
| 2011/0199985 | A1 | 8/2011 | Cai et al. |
| 2011/0243012 | A1 | 10/2011 | Luo et al. |
| 2011/0268176 | A1 | 11/2011 | Jeong et al. |
| 2012/0034927 | A1 | 2/2012 | Papasakellariou et al. |
| 2012/0057523 | A1 | 3/2012 | Ji et al. |
| 2012/0082101 | A1 | 4/2012 | Gaal et al. |
| 2012/0106442 | A1 | 5/2012 | Xiao |
| 2012/0236741 | A1 | 9/2012 | Xu et al. |
| 2012/0281556 | A1 | 11/2012 | Sayana et al. |
| 2013/0039162 | A1 | 2/2013 | Zhang et al. |
| 2013/0083719 | A1 | 4/2013 | Seo et al. |
| 2013/0128832 | A1 | 5/2013 | Kang et al. |
| 2013/0165122 | A1 | 6/2013 | Tanaka |
| 2013/0195000 | A1 | 8/2013 | Shen et al. |
| 2013/0231122 | A1 | 9/2013 | Vrzic et al. |
| 2013/0251058 | A1* | 9/2013 | Wu .......... H04B 7/0456 375/267 |
| 2013/0315337 | A1 | 11/2013 | Dai et al. |
| 2013/0322376 | A1 | 12/2013 | Marinier et al. |
| 2013/0329823 | A1* | 12/2013 | Khojastepour ...... H04B 7/0408 375/267 |
| 2014/0126484 | A1 | 5/2014 | Chen et al. |
| 2014/0161071 | A1 | 6/2014 | Nam et al. |
| 2014/0169408 | A1* | 6/2014 | Bayesteh .......... H04B 7/0473 375/144 |
| 2014/0192734 | A1 | 7/2014 | Ng et al. |
| 2014/0362701 | A1 | 12/2014 | Roh et al. |
| 2014/0365848 | A1 | 12/2014 | Roh et al. |
| 2014/0369434 | A1* | 12/2014 | Taherzadehboroujeni .......... H04B 7/0456 375/261 |
| 2015/0244439 | A1 | 8/2015 | Nam et al. |
| 2015/0289257 | A1 | 10/2015 | Luo et al. |
| 2015/0295695 | A1 | 10/2015 | Davydov et al. |
| 2015/0312074 | A1 | 10/2015 | Zhu et al. |
| 2015/0327274 | A1 | 11/2015 | Lim et al. |
| 2016/0028527 | A1 | 1/2016 | Nam et al. |
| 2016/0028528 | A1 | 1/2016 | Nam et al. |
| 2016/0036504 | A1 | 2/2016 | Khojastepour et al. |
| 2016/0080058 | A1 | 3/2016 | Kang et al. |
| 2016/0087694 | A1 | 3/2016 | Vilaipornsawai et al. |
| 2016/0234820 | A1 | 8/2016 | Mallik et al. |
| 2016/0286549 | A1 | 9/2016 | Abraham et al. |
| 2016/0353433 | A1 | 12/2016 | Roh et al. |
| 2017/0006539 | A1 | 1/2017 | Kakishima et al. |
| 2017/0093826 | A1 | 3/2017 | Werneyer et al. |
| 2017/0141886 | A1 | 5/2017 | Chung et al. |
| 2017/0163333 | A1 | 6/2017 | Breiling et al. |
| 2017/0171786 | A1 | 6/2017 | Mochizuki et al. |
| 2017/0202025 | A1 | 7/2017 | Ouchi et al. |
| 2017/0289984 | A1 | 10/2017 | Baligh et al. |
| 2017/0290046 | A1 | 10/2017 | Sun et al. |
| 2017/0359827 | A1 | 12/2017 | Kim et al. |
| 2018/0041988 | A1 | 2/2018 | Lee et al. |
| 2018/0159669 | A1 | 6/2018 | Chung et al. |
| 2018/0316371 | A1 | 11/2018 | Davydov et al. |
| 2019/0053224 | A1 | 2/2019 | Roh et al. |

FOREIGN PATENT DOCUMENTS

| | | |
|---|---|---|
| CN | 102918788 A | 2/2013 |
| CN | 103503326 A | 1/2014 |
| CN | 104486784 A | 4/2015 |
| CN | 104581845 A | 4/2015 |
| EP | 3297377 A1 | 3/2018 |
| JP | 2015185955 A | 10/2015 |
| JP | 2016506143 A | 2/2016 |
| WO | 2012020457 A1 | 2/2012 |
| WO | 2014090189 A1 | 6/2014 |
| WO | 2014201988 A1 | 12/2014 |

OTHER PUBLICATIONS

Furukawa, Hiroshi et al., "SSDT—Site Selection Diversity Transmission Power Control for CDMA Forward Link", IEEE Journal on Selected Areas in Communications, vol. 18. No. 8, Aug. 2000, pp. 1546-1554.

Gesbert, David et al., "Multi-Cell MIMO Cooperative Networks: A New Look at Interference", IEEE Journal on Selected Areas in Communications, vol. 28, No. 9, Dec. 2010, pp. 1-29.

Chae, Chan-Byoung et al., "Coordinated Beamforming with Limited Feedback in the MIMO Broadcast Channel", IEEE Journal on Selected Areas in Communications, vol. 26, No. 8, Oct. 2008, pp. 1505-1515.

Hoshyar, Reza et al., "Novel Low-Density Signature for Synchronous CDMA Systems Over AWGN Channel", IEEE Transactions on Signal Processing, vol. 56, No. 4, Apr. 2008, pp. 1616-1626.

Nikopour, Hosein et al., "Sparse Code Multiple Access", IEEE 24th International Symposium on Personal, Indoor and Mobile Radio Communications: Fundamentals and PHY Track, Sep. 2013, pp. 332-336.

Van De Beek, Jaap et al. "Multiple Access with Low-Density Signatures", Global Telecommunications Conference, IEEE GLOBECOM, Nov. 2009, pp. 1-6.

Zhang, Shunqing et al., "Sparse Code Multiple Access: An Energy Efficient Uplink Approach for 5G Wireless Systems", Gobal Communications Conference, IEEE GLOBECOM 2014—Wireless Networking Symposium, Dec. 2014, pp. 4782-4787.

Au, Kelvin et al., "Uplink Contention Based SCMA for 5G Radio Access", Proc. IEEE GLOBECOM 2014, Dec. 2014, pp. 1-6.

3GPP TR 36.814 V9.0.0, 3rd Generation Partnership Project; Technical Specification Group Radio Access Network; Evolved Universal Terrestrial Radio Access (E-UTRA); Further advancements for E-UTRA physical layer aspects (Release 9), 3GPP, Apr. 2013, pp. 1-104.

Taherzadeh, Mahmoud et al., "SCMA Codebook Design", IEEE VTC Fall, Sep. 2014, pp. 1-5.

Zarifi, Keyvan et al,. "Radio Access Virtualization: Cell follows User", IEEE 25th International Symposium on Personal, Indoor and Mobile Radio Communications, Sep. 2014, pp. 1381-1385.

"The Second Phase of LTE-Advanced, LTE-B: 30-fold Capacity Boosting to LTE", Huawei Technologies, Co., Ltd., 2013, http://www.huawei.com/en/industry-insights/huawei-voices/white-papers/hw_259010, pp. 1-20.

ZTE Motivation for study on enhancements for densely deployed small cells in LTE 3GPP TSG RAN Meeting #70. Dec. 10, 2015. RP-151790. pp. 1-8.

ZTE Initial Analysisi of Ultra Dense Network 3GPP TSG RAN Meeting #68. Jun. 18, 2015. RP-150612.pp. 1-6.

Usa Vilaipornsawai et al.,"SCMA for Open-Loop Joint Transmission CoMP", Computer Science, dated Apr. 7, 2015, total 5 pages.

Malte Schellmann ,"Mobile and wireless communications Enablers for the Twenty-twenty Information Society (METIS)"—Proposed solutions for new radio access Deliverable D2.4, Document Number: ICT-317669-METIS/D2.4, dated Feb. 28, 2015, total 190 pages.

Usa Vilaipornsawai, SCMA for Open-Loop Joint Transmission CoMP, 2015 IEEE 82nd Vehicular Technology Conference, Sep. 6, 2015, total 7 pages.

* cited by examiner

MOBILITY HANDLING IN ULTRA DENSE NETWORKS

CROSS-REFERENCE TO RELATED APPLICATION

The present application claims the benefit of U.S. Provisional Application Ser. No. 62/270,734, entitled "Mobility Handling In Ultra Dense Networks", filed on Dec. 22, 2015, the entire contents of which are incorporated herein by reference.

FIELD

The present disclosure relates generally to Ultra Dense Networks (UDNs) and, in particular, to handling mobility in UDNs.

BACKGROUND

In UDNs, network nodes that provide wireless communication service to user equipment (UEs) are located closer to each other than in less dense "macro" networks. A UE may therefore transition between service areas of different network nodes when it is moved over a smaller distance relative to the distance for transitions between service areas in less dense networks. Service area transitions by UEs may also occur more often in UDNs.

Current Long Term Evolution (LTE) systems rely on handovers between network nodes to support UE mobility between service areas. It may be desirable to avoid handover processing every time a UE transitions between service areas, especially in networks such as UDNs in which frequent service area transitions may be expected.

SUMMARY

According to one aspect of the present disclosure, a method performed by a UE includes receiving a first plurality of communication signals from a first subset of network nodes when the UE is located in a first service area of a communication network, each communication signal of the first plurality of communication signals being associated with a respective one of a plurality of communication signal layers in the communication network; identifying first candidate communication signal layer decoding parameters, from a set of communication signal layer decoding parameters that are available at the UE, for layer-based decoding of the first plurality of communication signals; applying layer-based decoding to the first plurality of communication signals using the first candidate communication signal layer decoding parameters; receiving a second plurality of communication signals from a second subset of network nodes after the UE is moved to a second service area, each communication signal of the second plurality of communication signals being associated with a respective one of the plurality of communication signal layers, the second subset of network nodes including at least one network node that is not in the first subset of network nodes; identifying second candidate communication signal layer decoding parameters, from the set of communication signal layer decoding parameters that are available at the UE, for layer-based decoding of the second plurality of communication signals; applying layer-based decoding to the received second plurality of communication signals using the second candidate communication signal layer decoding parameters.

A UE according to another aspect of the present disclosure includes: a receiver to receive a first plurality of communication signals from a first subset of network nodes when the UE is located in a first service area of a communication network, each communication signal of the first plurality of communication signals being associated with a respective one of a plurality of communication signal layers in the communication network; and a signal decoder, coupled to the receiver, to identify first candidate communication signal layer decoding parameters, from a set of communication signal layer decoding parameters that are available at the UE, for layer-based decoding of the first plurality of communication signals, and to apply layer-based decoding to the first plurality of communication signals using the first candidate communication signal layer decoding parameters. The receiver is further configured to receive a second plurality of communication signals from a second subset of network nodes after the UE is moved to a second service area of the communication network, each communication signal of the second plurality of communication signals being associated with a respective one of the plurality of communication signal layers, the second subset of network nodes including at least one network node that is not in the first subset of network nodes. The signal decoder is further configured to identify second candidate communication signal layer decoding parameters, from the set of communication signal layer decoding parameters that are available at the UE, for layer-based decoding of the second plurality of communication signals, and to apply layer-based decoding to the received second plurality of communication signals using the second candidate communication signal layer decoding parameters.

According to a further aspect of the present disclosure, a method includes: configuring a first subset of network nodes in a communication network to transmit first communication signals that are decodable by a user equipment (UE) using decoding parameters for communication signals associated with communication signal layers in the communication network, each of the first communication signals being associated with a respective one of the plurality of communication signal layers; configuring a second subset of the network nodes in the communication network to transmit second communication signals that are decodable by the UE using the decoding parameters, the second subset of network nodes including at least one network node that is not in the first subset of network nodes, each of the second communication signals being associated with a respective one of the plurality of communication signal layers.

Another aspect of the present disclosure relates to an apparatus that includes a coordination controller to: configure a first subset of network nodes in the communication network to transmit first communication signals that are decodable by the UE using the decoding parameters, each of the first communication signals being associated with a respective one of the plurality of communication signal layers; configure a second subset of the network nodes in the communication network to transmit second communication signals that are decodable by the UE using the decoding parameters, the second subset of network nodes comprising at least one network node that is not in the first subset of network nodes, each of the second communication signals being associated with a respective one of the plurality of communication signal layers. The apparatus also includes a coordination interface, coupled to the coordination controller, to communicate with the network nodes.

Other aspects and features of embodiments of the present disclosure will become apparent to those ordinarily skilled in the art upon review of the following description.

BRIEF DESCRIPTION OF THE DRAWINGS

Embodiments of the invention will be described in greater detail with reference to the accompanying drawings.

DETAILED DESCRIPTION

For illustrative purposes, specific example embodiments will now be explained in greater detail below in conjunction with the figures.

The embodiments set forth herein represent information sufficient to practice the claimed subject matter and illustrate the best way of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Turning now to the figures, some specific example embodiments will be described.

Figure 1:
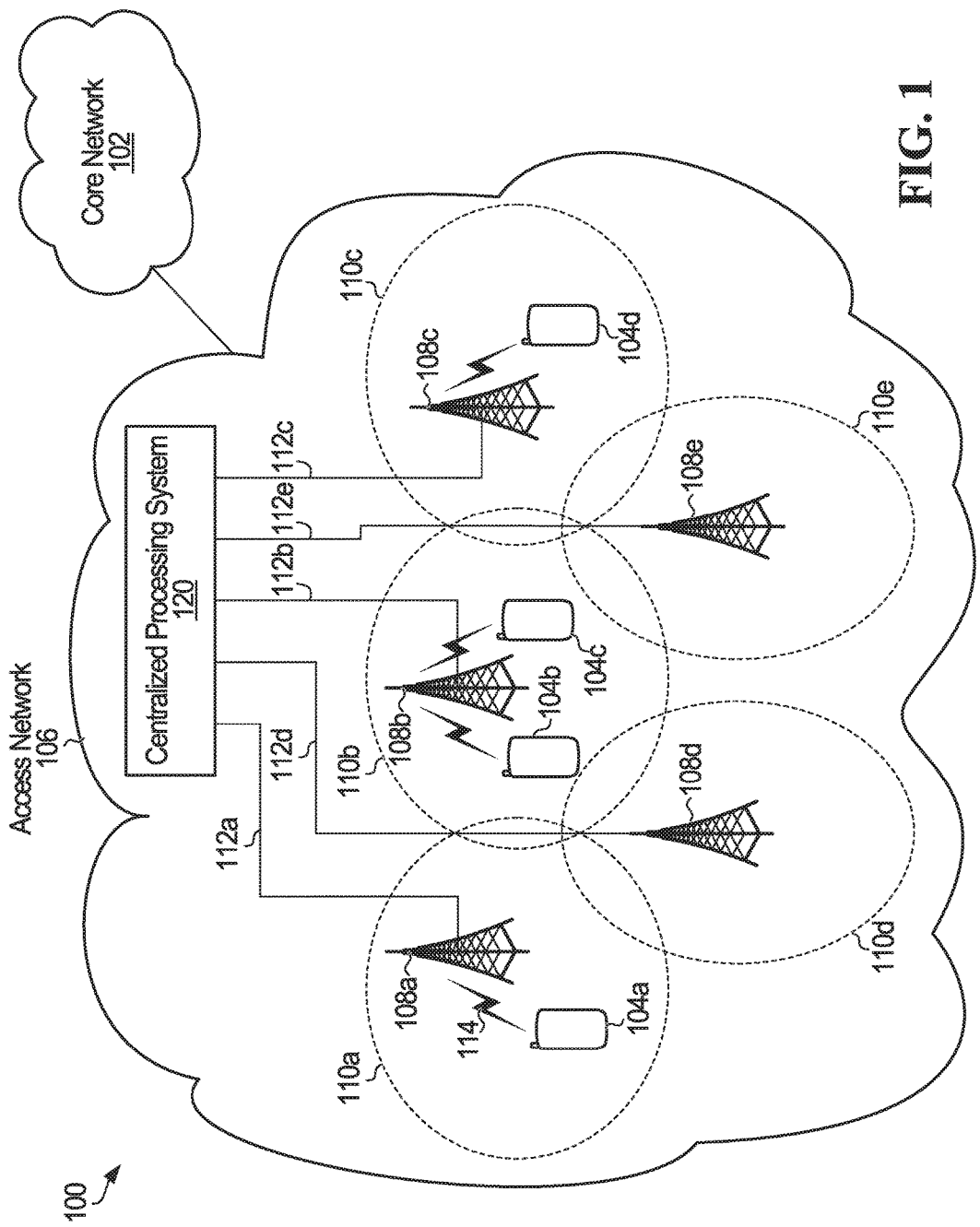
FIG. 1 is a block diagram illustrating a communication network in accordance with one embodiment.

FIG. 1 is a diagram illustrating a communication network in accordance with one embodiment. The communication network 100 includes a core network 102 and an access network 106.

The core network 102 may provide any of various services, such as call control/switching and gateways to other networks. The core network 102 includes network components such as routers, switches, and servers.

The access network 106 is a UDN, and is connected or coupled to the core network 102. The network nodes 108a, 108b, 108c, 108d, 108e, which may also be referred to as transmit points or TPs in UDN terminology, provide wireless communication service within respective wireless coverage areas 110a, 110b, 110c, 110d, 110e. Each network node 108a-e may be implemented using a radio transceiver, one or more antennas, and associated processing circuitry, such as antenna radio frequency (RF) circuitry, analog-to-digital/digital-to-analog converters, etc.

UEs 104a, 104b, 104c, 104d wirelessly access the communication network 100 using the access network 106. Each UE 104a-d includes a radio transceiver, one or more antennas, and associated processing circuitry, such as antenna radio frequency (RF) circuitry, analog-to-digital/digital-to-analog converters, etc. The network nodes 108-e and the UEs 104a-d may include similar types of components to support communications with each other in the communication network 100, but the actual implementations may be different. For example, the UEs 104a-d are portable between locations, whereas the network nodes 108a-e are typically intended to be installed at a fixed location.

The network nodes 108a-e are connected to a centralized processing system 120 in the access network 106, via respective communication links 112a, 112b, 112c, 112d, 112e. Each communication link 112a-e is a fibre communication link in one embodiment. Each network node 108a-e includes circuitry for transmitting data to the centralized processing system 120 and for receiving data from the centralized processing system via its respective communication link 112a-e. Although shown as a single centralized processing system in FIG. 1, the centralized processing system 120 may be implemented by a network of one or more processing and control servers. Alternatively, the centralized processing system 120 may be implemented as a single server.

The network nodes 108a-e may serve as a gateway between wireline and wireless portions of the access network 106, although this need not be the case in embodiments in which the communication links 112a-e are wireless links. Network nodes may be placed at fixed locations by a network provider, for example, in a strategic manner to provide a continuous wireless coverage area. This is shown in FIG. 1 in that wireless coverage areas 110a-e overlap each other so that the UEs 104a-d may move throughout the wireless coverage areas and still be served by the access network 106. At different locations in the access network 106, different subsets of the network nodes 108a-e provide wireless communication service.

Some service areas in the access network 106 are serviced by a single network node, as in the case of the current locations of the UEs 104a-d. However, the wireless coverage areas 110a-e also overlap with each other. A UE, when located in a service area that has overlapping coverage from multiple network nodes, is exposed to communication signals from those network nodes. A subset of network nodes providing communication service in a service area could therefore include one or more network nodes.

In a UDN such as the access network 106, the network nodes 108a-e are located closer to each other than in other types of communication networks. A UE may therefore change service areas as a result of moving over a smaller distance than in a communication network in which there are fewer network nodes, located farther away from each other, with larger wireless coverage areas. In moving from left to right in FIG. 1, for example, the UE 104a could transition through different service areas as follows:

from a service area that is serviced by the network node 108a to a service area that is serviced by the network nodes 108a, 108d (at a location within the overlapping region of the wireless coverage areas 110a, 110d);
  from the service area that is serviced by the network nodes 108a, 108d to a service area that is serviced by the network nodes 108a, 108d, 108b (at a location within the overlapping regions of the wireless coverage areas 110a, 110d, 110b);
  from the service area that is serviced by the network nodes 108a, 108d, 108b to a service area that is serviced by the network node 108b;
  and so on, through different service areas in which different network subsets including one or more of the network nodes 108a-e provide communication service.

In a UDN, these service area transitions could all occur for a UE that travels only a few hundred meters, for example. Handover processing that is used to support UE mobility in current LTE systems and other communication networks can represent a significant burden on communication and processing resources when service area transitions occur over such a short distance and are expected to be frequent.

The present disclosure proposes a communication signal "layer" approach to mobility in UDNs. Joint detection and decoding methods such as Successive Interference Cancellation (SIC), Message Passing Algorithm (MPA), or Maximum Likelihood Detection (MLD) allow a UE to jointly receive and decode communication signals that are associated with multiple layers, which could be received from multiple network nodes.

Network node to UE associations may be applied dynamically, as disclosed herein. In an embodiment, multiple layers, which may originate from multiple network nodes, are associated to a UE. As the UE moves, a different subset of network nodes takes responsibility for serving the UE. Service area transitions can be transparent to the UE, with transparent layer to network node associations and/or transparent "active" network node subsets.

Communication signal layers, also referred to as simply "layers" herein, could include respective data streams in an Orthogonal Frequency Division Multiplexing (OFDM) domain, a code domain using respective codebooks, and/or a spatial domain, for example. In a code domain, communication signals associated with different layers are encoded using different codebooks. In one embodiment, incoming bits are mapped to sparse multi-dimensional complex codewords selected from predefined codebook sets in an approach that may also be known as Sparse Code Multiple Access (SOMA). Spatial domain layers could be layers in a Multiple Input Multiple Output (MIMO) system, for example.

Layers could be allocated to UEs or to network nodes. Both of these options are described in detail below. Although the detailed descriptions below refer to code domain layers, other types of layers are also possible.

Figure 2:
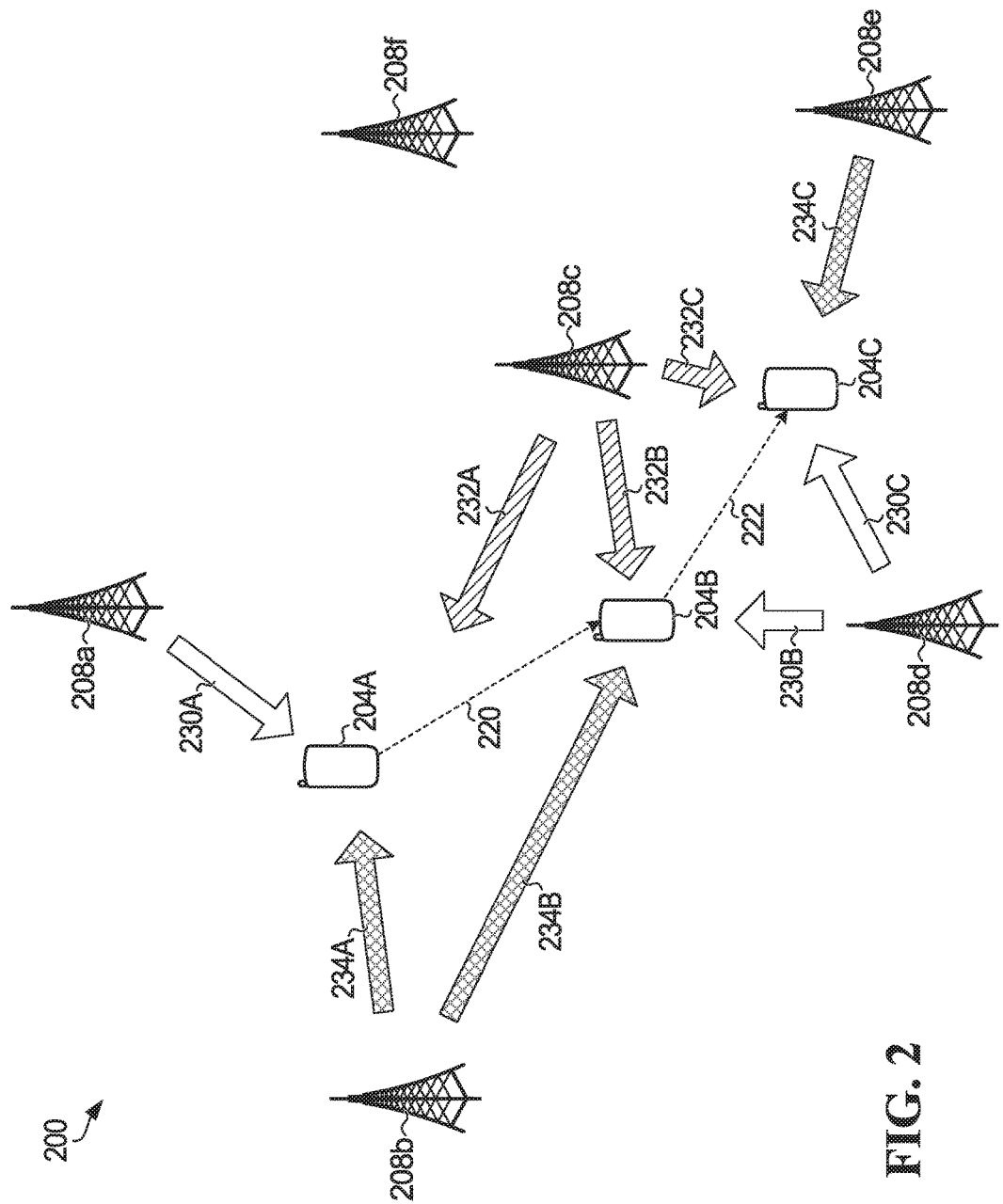
FIG. 2 is a block diagram illustrating UE communication signal layer allocation and mobility.

In a UE layer allocation approach, one or more layers are provisioned for and allocated to a UE. This approach might be more suitable in a lightly loaded network, for example, in which a sufficient number of layers are available for allocation of at least one layer to each UE. FIG. 2 is a block diagram illustrating UE layer allocation and mobility.

In order to avoid congestion in the drawing, FIG. 2 shows only network nodes 208a, 208b, 208c, 208d, 208e, 208f of a UDN 200, without a centralized processing system or core network as shown in FIG. 1. Different locations of a UE are shown at 204A. 204B, 204C, and the A, B, C labels are intended to denote the different locations of the same UE rather than different UEs. Movement of the UE is shown at 220, 222. Three layers are represented at 230A, 230B, 230C, 232A, 232B, 232C, 234A, 234B, 234C, with the numbers 230, 232, 234 denoting the three different layers and the A, B, C labels denoting the signals received when the UE is at each of the locations shown at 204A, 204B, 204C, respectively. The network node 208f is not involved in the mobility example in FIG. 2, but is shown to illustrate that the communication network 200 could include additional network nodes that do not belong to any of the network node subsets that provide service to a UE as it moves between service areas within a communication network.

The UE is exposed to multiple communication signals at each location 204A, 204B, 204C. At location 204A, for example, the UE receives communication signals that are respectively associated with the layers 230A, 232A, 234A. The signals carried by the three layers 230A, 232A, 234A are received by the UE from three different network nodes 208a, 208b, 208c in this example, but multiple layers could originate from a single network node in other embodiments.

Interference caused by network nodes in serving other UEs is not a limiting factor in the communication system 200. The UE at location 204A, for example, receives and applies layer-based decoding to the communication signals that are associated with the layers 230A, 232A, 234A. For code domain layers, the UE receives a set of codebooks with corresponding pilot patterns. The codebooks for different layers could be allocated and distributed to UEs by a centralized processing system as shown at 120 in FIG. 1, for example. Multiple layers may share the same pilot set and originate from the same physical/logical antenna port in some embodiments.

The UE estimates the channel or communication signal that is associated with each of the different layers, and attempts to jointly decode the data associated to the UE. For code domain layers, the UE when located at 204A uses the layer codebooks to decode the received communication signals, and may discard the communication signals associated with any layers that have not been allocated to it.

As the UE moves, a "potential" network node subset that includes the network nodes that may provide service to the UE could change. The potential network node subset could be updated using one or more of uplink (UL) reciprocity, a tracking channel, user feedback, location services, etc. Movement of the UE from the location 204A to the location 204B, as represented at 220, could be detected by a centralized processing system shown at 120 in FIG. 1, for example. The potential network node subset now includes the network nodes 208b, 208c, 208d that provide communication service in the service area in which the UE is now located. This potential network node subset is determined based on the current location of the UE at 204B. Again, this could be handled by a centralized processing system, which could also advise the network node 208d that it is part of the potential network node subset for the UE. The network node 208a could similarly be advised, by a centralized processing system or other component in the communication network 200, that it is no longer part of the subset that is providing service to the UE.

When the UE is at location 204B, it is the network node 208*d* that is responsible for the layer 230. 230A and 230B in FIG. 2 represent the same layer. This layer could therefore be considered to have been transferred from the network node 208*a* to the network node 208*d*, following the UE as it moves. The UE may not be aware of the current network node-layer association. From the perspective of the UE, communication signals associated with the same layers are received at the locations 204A and 204B, and the UE need not necessarily be aware that one of the layers has moved from the network node 208*a* to the network node 208*d*. As far as the UE is concerned, it is decoding communication signals associated with the same layers, using the same codebooks in a code domain layer implementation for example, whether it is at the location 204A or the location 204B. This type of layer transition between different network nodes could be transparent to the UE, although it could instead be acknowledged, by the UE and/or network node(s), in other embodiments.

The same consistency of communications and layers also applies for movement of the UE from the location 204B to the location 2040, represented at 222. In this case, the layer 234 is moved from the network node 208*b* to the network node 208*e*, as shown at 234C.

Such UE layer allocation and transitioning of layers between different network nodes may be used to support mobility without requiring explicit handover processing every time the potential network node subset changes as the UE moves between service areas.

Even with UE layer allocation, codebooks could be updated. UE codebooks could be periodically updated and distributed, by a centralized processing system as shown at 120 in FIG. 1 for example. Codebooks and codebook assignments could therefore be considered to be dynamic or semi-static, depending on how often codebook updates are made. However, such codebook updating is not necessarily performed as part of the layer transition process outlined herein. A UE could use the same codebook(s) for its allocated layer(s), regardless of the particular network nodes in the current active or potential network node subset, if the UE moves between service areas before a codebook update occurs and the layers remain the same after the UE is moved into a different service area.

The layers need not necessarily remain the same as a UE is moved between different service areas. For example, a layer might not have been transferred to a different network node when the UE moves into a different service area, and that layer would then be absent from the active set of layers for a period of time. A layer could instead be removed entirely or re-allocated to a different UE, and not moved to a different network node as the UE moves between service areas. A layer could be removed or re-allocated, for example, in embodiments in which a different layer is allocated to the UE, or multiple layers are allocated to the UE and one or more layers remain allocated to the UE after a layer is removed.

Other communication characteristics could similarly be dynamic or semi-static. For example, characteristics such as Forward Error Correction (FEC) coding rate and/or the actual number of layers allocated to a UE could be updated frequently, such as at each downlink (DL) grant.

A UE could perform blind detection to determine the layers that are active at its current location. Blind detection relates to identifying resources based on properties of the received signal, without a priori knowledge such as signaling from the transmitter to indicate which resources are being used. In a blind detection implementation, the UE blindly detects the active layer set, by determining the layers for which it is able to decode communication signals. A UE could instead be informed of the active layers by one or more network nodes, for example as part of a grant of wireless resources. Either of these approaches could provide for distributed scheduling, with each network node deciding whether to serve the UE.

Other options for a UE layer allocation system include vertical or horizontal coding. In a synchronous network, for example, vertical coding could utilize the same FEC block for all layers and involve some data sharing.

Some embodiments may support layer "lending". For example, a centralized processing system could make a decision to use a UE's codebook from one or multiple network nodes to serve other UEs. In this case, a UE could jointly decode communication signals associated with all the layers from all network nodes, but keep only its own data and discard data intended for other UEs.

Figure 3:
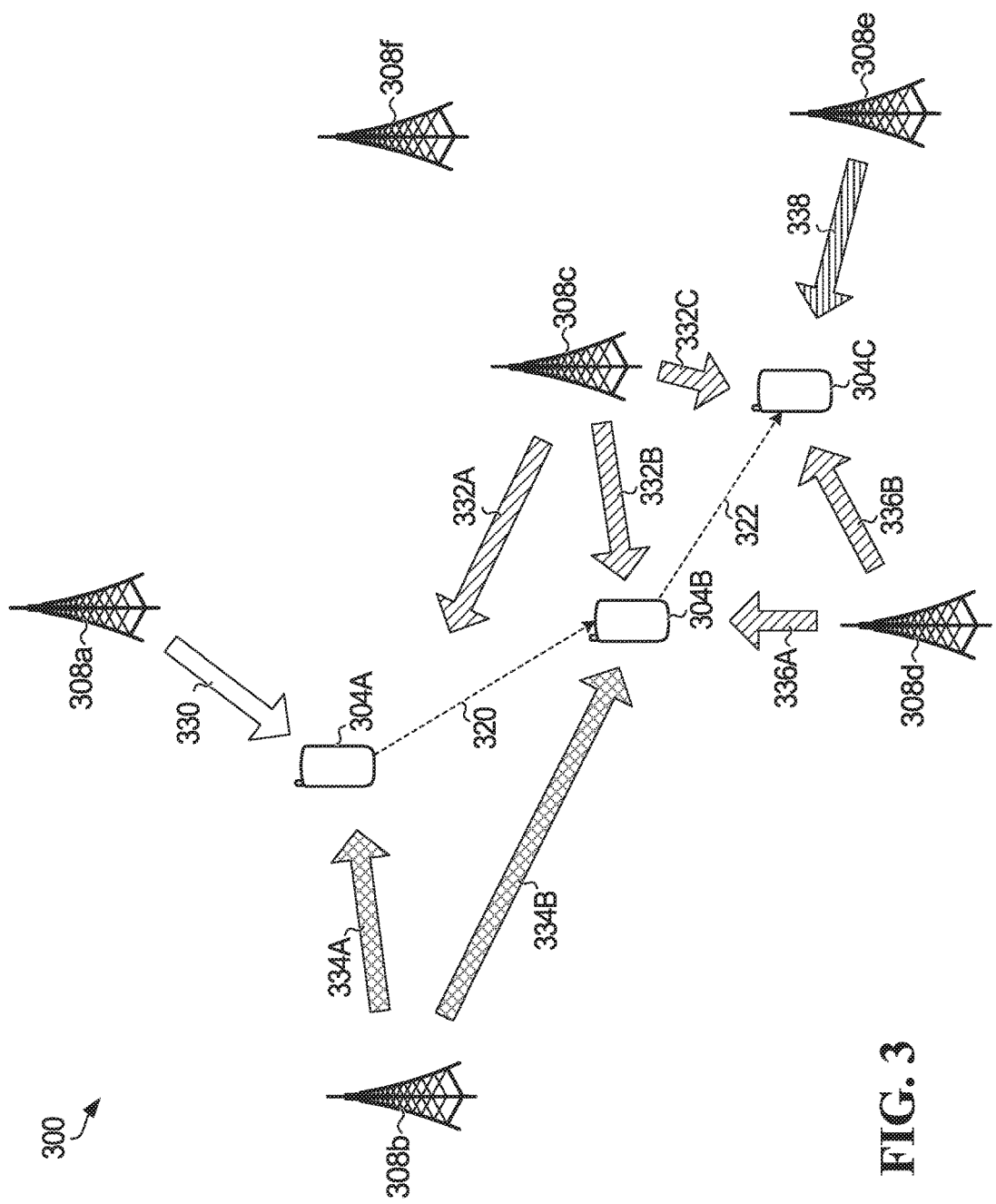
FIG. 3 is a block diagram illustrating network node communication signal layer allocation and mobility.

FIG. 2 and the description above relate to UE layer allocation. Network node layer allocation is also possible. A network node layer allocation solution might be more suited for scenarios in which the network load is high and/or the number of UEs is greater than the number of available layers, for example. FIG. 3 is a block diagram illustrating network node layer allocation and mobility.

As in FIG. 2, FIG. 3 shows only network nodes 308*a*, 308*b*, 308*c*, 308*d*, 308*e*, 308*f* of a UDN 300, different locations of a UE are shown at 304A, 304B, 304C, and movement of the UE is shown at 320, 322. Layers 330, 332A, 332B, 332C, 334A, 334B, 336A, 336B, 338 in FIG. 3, however, are allocated to the network nodes 308*a*, 308*b*, 308*c*, 308*d*, 308*e* instead of to the UE.

In FIG. 3, each network node 308*a*, 308*b*, 308*c*, 308*d*, 308*e* is assigned one or more layers. One or more layers could also be allocated to the network node 308*f*, but are not shown in FIG. 3 because the network node 308*f* is not involved in providing service to the UE in this example.

In a code domain layer system, a list of the possible codebooks and pilots, for layers that are allocated to network nodes in the vicinity of the UE, is distributed to the UE. Such a list of the possible codebooks and pilots is an example of candidate decoding parameters that the UE is to use in applying layer-based decoding to received communication signals. A list of candidate decoding parameters could include information identifying decoding parameters not only for layers that are active within a service area in which the UE is currently located, but also for layers that may be active in a different service area, such as a service area that is adjacent to the current service area. In this example, if the UE moves from the service area to the adjacent service area, then the UE may use the same candidate decoding parameters to attempt to decode received communication signals.

Layers for the same network node could share the same pilot pattern. The FEC code rate and possibly other related information could also be communicated to the UE. This information could be explicitly known to the UE, either through broadcast or unicast signaling or by being standardized within the network 300 so it is known a priori to the UE.

At each location 304A, 304B, 304C, the UE is exposed to multiple communication signals. Each communication signal is associated with a different layer, and is received from a different network node in FIG. 3. For example, at location 304A the UE receives communication signals that are respectively associated with the layers 330, 332A, 334A, from the network nodes 308a, 308b, 308c.

The UE applies layer-based decoding to the received communications signals, using the candidate codebooks. The UE could report, to a centralized processing system as shown at 120 in FIG. 1 for example, a list of codebooks that were successful in decoding the received communication signals. This could involve a direct or indirect measurement channel. A UE could use previous transmit time interval (TTI) information to determine the layers for which communication signals are decodable, and use a measurement channel to send a list of decodable layers to a centralized processing system, for example. Information regarding the layers for which communication signals are decodable, or another type of indication of which candidate layer decoding parameters were used to decode received communication signals, could be used to determine the current location of the UE, because the communication signals that are decodable are associated with the layers that are allocated to the network nodes 308a, 308b, 308c when the UE is at location 304A. More generally, the location of the UE could be determined based on the layer decoding parameters, such as codebooks, that it is able to use to successfully decode communication signals, and the network nodes to which the layers associated with the decodable signals are allocated. The UE is able to successfully decode communication signals using different codebooks, for example, depending on its location.

After the UE moves to location 304B, as represented at 320, the UE receives communication signals from the network nodes 308b, 308c, 308d and applies layer-based decoding to the received signals. The UE is now able to use the codebooks for the layers that are allocated to those network nodes to successfully decode communication signals. The codebooks and the layers that are active at the location 304B include the layers 332B, 334B, 336A. Two of these layers 332B, 334B are associated with signals that are received at location 204A, but in this example there is one different layer 336A. There is no layer transition between different network nodes in FIG. 2. The UE might not be aware of the current network node-layer association at the current location of the UE. The UE when at the location 304B could still be attempting to decode the received communication signals using the same set of candidate codebooks that it used when at the location 304A. At the location 304B, a candidate codebook that could not be used to successfully decode any communication signals that were received at the location 304A now corresponds to a received signal and can decode the received communication signal.

In another embodiment, information identifying a different set of candidate decoding parameters, codebooks in this example, is transmitted to the UE when a network node or centralized processing system determines that the UE has moved between service areas. However, as in the UE layer allocation mobility example in FIG. 2, there need not be any explicit handover processing in FIG. 3 when the active subset of network nodes changes from 308a, 308b, 308c at the location 304A, to 308b, 308c, 308d at the location 304B. The UE may receive information identifying new candidate decoding parameters when it moves between service areas, but still need not be aware that the new candidate decoding parameters are for layers that originate from a different subset of network nodes, which includes at least one different network node, in a different service area.

Further movement of the UE from the location 304B to the location 304C, represented at 322, similarly changes the active subset of network nodes to 308c, 308d, 308e. Two of the layers 3320, 336B are the same as at the location 304B, but the codebook for layer 338 is now able to decode communication signals that are received by the UE at the location 3040.

Layer to network node allocation in a network node layer allocation implementation could be semi-static or static, depending on the number of network nodes and the number of codebooks that are available for allocation, for example. Layers could also or instead be initially allocated to network nodes or moved from one network node to another, for example for load balancing or energy saving. New or updated codebook allocations are distributed to network nodes by a centralized processing system as shown at 120 in FIG. 1 in one embodiment. New or updated codebook and pilot signal lists could similarly be distributed to UEs.

Scheduling of a UE in a network node layer allocation system could be handled by each network node (distributed scheduling) or in a centralized manner by a centralized processing system as shown at 120 in FIG. 1. The decisions of a scheduler could be sent as part of a grant of wireless resources, or blindly detected by the UE based on the layers for which it is able to decode communication signals.

Layer coordination could be dynamically optimized by network nodes coordinating with each other or under control or direction of a centralized processing system. Such dynamically optimized layer coordination may, however, place higher requirements on backhaul and synchronization. Other options for layer coordination include semi-statically optimized layer coordination and long term coordination and settings, which could be implemented with more relaxed backhaul and synchronization requirements. Hybrid coordination, to accommodate different levels of cooperation between network nodes, is a further option.

Figure 4:
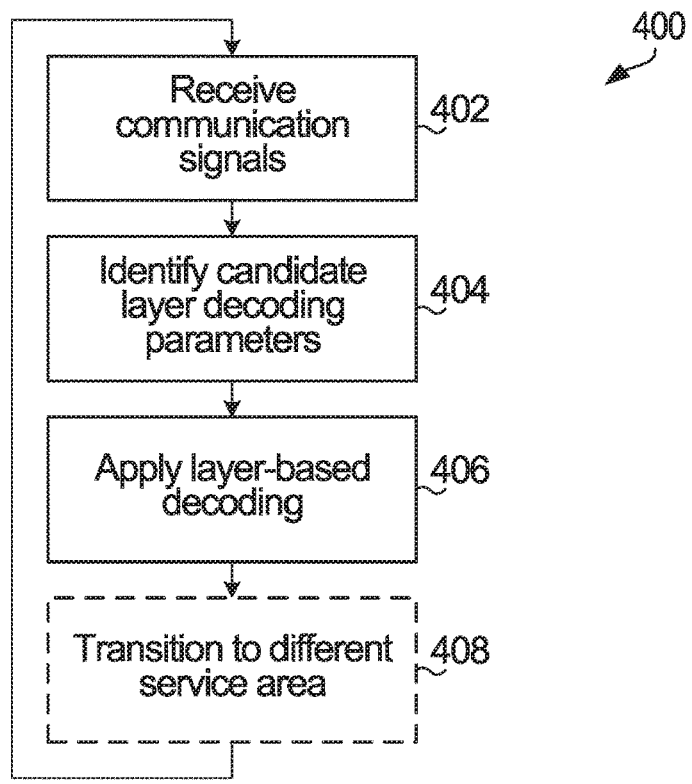
FIG. 4 is a flow diagram of a method according to an embodiment.

FIG. 4 is a flow diagram of a method according to an embodiment. The method 400 is illustrative of a method performed by a UE.

At 402, the UE receives communication signals from a subset of network nodes, as described above with reference to FIGS. 2 and 3. Each of the received communication signals is associated with a respective one of multiple layers.

Candidate layer decoding parameters are identified at 404. This identification of candidate decoding parameters could involve accessing a list of candidate codebooks in a memory, for example. Such a list, or more generally information identifying candidate decoding parameters, could be generated by a network node or a centralized processing system based on the current location of the UE, and distributed to the UE. The candidate decoding parameters could include all decoding parameters that are available at the UE, or a subset of those decoding parameters. Information that identifies the candidate decoding parameters that the UE is to use in layer-based decoding of received communication signals need not include the decoding parameters. The decoding parameters could be distributed to the UE separately, and the decoding parameters are then available at the UE for use in layer-based decoding.

The candidate decoding parameters could include a set of codebooks for all layers in a network or at least codebooks for layers that may be active in one or more service areas of the network. The layers that may be active in a service area could include layers that are already active in the case of network node layer allocation, or layers that are not yet active but may subsequently become active after the UE moves to a different service area in the case of UE layer allocation and layer transition between network nodes.

Layer-based decoding is applied to the received communication signals at 406. The layer-based decoding uses the candidate layer decoding parameters identified at 404. The UE attempts to decode the received communication signals using the candidate decoding parameters.

Consider the example shown in FIG. 2, in the context of code domain layers. At the location 204A, the UE applies layer-based decoding using the codebooks for the three layers 230A, 232A, 234A that it receives. With layer transition between network nodes as shown in FIG. 2, the same codebooks are also used at the location 204B, to apply layer-based decoding to additional communication signals that are received by the UE at that location. Thus, the codebooks are an example of layer decoding parameters for the layers with which the current received communication signals at location 204A are associated, regardless of the particular network nodes from which the layers originate.

Similarly, in the network node layer allocation example shown in FIG. 3, the UE applies layer-based decoding using the codebooks for the three layers 330, 332A, 334A associated with the communication signals that it receives at the location 304A. As noted above, not all layers may be decodable at this location of the UE. However, the UE may still attempt to decode (that is, apply layer-based decoding) using all of the codebooks in its current candidate codebook list, and determine the layers for which communication signals are decodable. Some of the candidate codebooks might work, and others might not. The codebook for the layer 336A cannot be used to successfully decode a communication signal when the UE is at the location 304A, but will work when the UE moves to the location 304B. Thus, the candidate codebooks in this example represent one form of decoding parameters for the layers with which the current received communication signals at location 304A are associated, and also for layers outside the current service area, after the UE moves to the location 304B.

The method 400 may be repeated as new communication signals are received. A UE could receive new communication signals while it remains in the same service area and attempt to decode those signals as described above. The UE could instead transition to a different service area as shown at 408, and receive communication signals at 402 from a different subset of network nodes. The UE may identify some or all of the same candidate layer decoding parameters at 404 as in the previous service area, and use those candidate decoding parameters at 406 to attempt to decode the new received communication signals. The identification of candidate layer decoding parameters could be based on information that is received by the UE, from a centralized processing system as shown at 120 in FIG. 1, for example. The received information could include information identifying first candidate communication signal layer decoding parameters to be used by the UE in one service area, and information identifying second candidate communication signal layer decoding parameters to be used by the UE after it is moved to a different service area.

Candidate decoding parameters may, but need not necessarily, change when a UE moves between service areas. In the UE layer allocation mode, for example, the communication signal layers allocated to the UE could be the same in different service areas, and therefore the same candidate decoding parameters could be identified by the UE at 404 and used in different service areas. In the network node layer allocation mode, the UE could be provided with information identifying decoding parameters for layers that might be active in its current service area and layers that might be active in an adjacent service area. In this scenario, the UE could use the same candidate decoding parameters when it is located in the current service area and after it moves to the adjacent service area.

In the UE layer allocation case, the layer decoding parameters are for decoding communication signals associated with a layer that is allocated to the UE. These parameters are independent of which particular one of the network nodes transmits the communication signals. For the network node layer allocation case, the decoding parameters are for decoding communication signals associated with layers that are allocated to the network nodes.

The example method 400 is illustrative of one embodiment. Other embodiments could include different or additional operations. Examples of additional operations that may be performed, and/or various ways to perform the illustrated operations, may be or become apparent.

For example, different layers from the same network node or different network nodes could be decoded at 404 using any of a variety of decoding methods, such as SIC, MPA, joint detection, MLD and MIMO (linear or non-linear) decoders, or a combination of decoding methods.

In some embodiments, UE location is tracked based at least in part on the layer(s) for which communication signals are successfully decoded. An example of an additional operation that could be performed in such an embodiment is transmitting, to a network node, an indication of the candidate decoding parameters that were used to successfully decode communication signals. This operation could be performed after 406 in FIG. 4, for instance. In a mobility scenario, a UE could transmit to a network node of a first subset of network nodes an indication of which of first candidate decoding parameters were used to decode a first plurality of received communication signals, and/or transmit to a network node of a second subset of network nodes an indication of which of second candidate layer decoding parameters were used to decode a second plurality of communication signals received after a service area transition.

For example, the UE could detect a change in the set of layer decoding parameters that were used to successfully decode received communication signals, and, in response to detecting the change, transmit an indication of which layer decoding parameters were used to decode communication signals. Transmission of such an indication could also or instead be request-based, with the UE transmitting an indication in response to a request from a centralized processing system or network node. Other options, including periodic or scheduled transmission times, are also possible.

The description above refers generally to layers and to communication signals that are associated with such layers. There could be multiple tiers of layers. The decoding method could separate different data layers, with a UE first successfully decoding communication signals associated with one layer before proceeding to the next. A tiered structure could instead involve multiple layers in an arrangement such that communication signals associated with layers at one tier would be decoded before attempting to decode at a higher tier. For example, a first layer could have a relatively low modulation and coding scheme (MCS) and a second layer could have a relatively high MCS, such that the first layer can be decoded without knowledge of the second layer, and it is advantageous to decode the first layer prior to decoding the second layer. In both cases, there may be multiple tiers of layers, and layer-based decoding is first applied to decode one or more communication signals associated with layers of a first tier before applying layer-based decoding to communication signals of a second tier. A special case of a tiered structure includes only one layer per tier.

Figure 5:
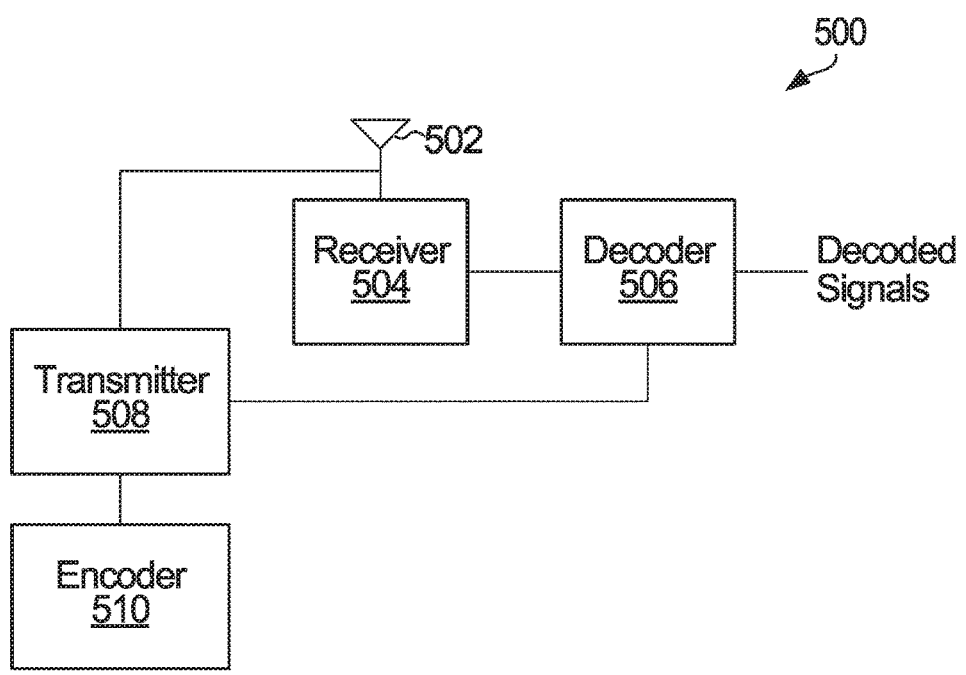
FIG. 5 is a block diagram illustrating a UE according to an embodiment.

FIG. 5 is a block diagram illustrating a UE 500 that may perform the above methods according to an embodiment. The example UE 500 includes an antenna 502, a receiver 504 operatively coupled to the antenna, and a decoder 506 operatively coupled to the receiver. Although embodiments disclosed herein relate primarily to receiving and decoding communication signals, a UE may include components such as a transmitter 508 and an encoder 510 operatively coupled to the transmitter. The transmitter 508 is also operatively coupled to the antenna 502, and to the decoder 506 in the example shown.

Although a single antenna 502 is shown in FIG. 5, a UE could include multiple antennas. Separate receive and transmit antennas or sets of multiple antennas could be provided at 502, or the same antenna or set of multiple antennas could be used for both receiving and transmitting communication signals. The antenna 502 could include one or more antennas of any of various types. The type(s) of antenna(s) provided at 502 could be implementation-specific.

In general, hardware, firmware, components which execute software, or some combination thereof might be used in implementing the receiver 504, the decoder 506, the transmitter 508, and the encoder 510. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Software and/or information such as codebooks that may be used in operation of the UE 500 could be stored in one or more physical memory devices. Solid-state memory devices and/or memory devices with movable or even removable storage media could be implemented. Examples of memory devices are provided above. Memory devices could be internal to one or more of the components shown in FIG. 5, and therefore have not been shown separately in the drawing. External memory devices operatively coupled to the illustrated components, or to one or more processors that implement those components, are also possible.

The receiver 504 could perform such operations as frequency down-conversion and demodulation, and the transmitter 508 could perform inverse operations, including frequency up-conversion and modulation. The receiver 504 and the transmitter 508 could perform other operations instead of or in addition to these example operations, depending on the specific implementation and the types of communication functions and protocols to be supported. The decoder 506 applies layer-based decoding to received communication signals as described herein, and the encoder 510 applies encoding in accordance with the layer or layers on which the UE transmits to network nodes.

The receiver 504 is operative to receive communication signals from one or more network nodes that provide communication service in a service area of a communication network. Each communication signal is associated with a respective layer. The decoder 506 is operative to apply layer-based decoding to the received communication signals using candidate layer decoding parameters, as described above with reference to FIG. 4, for example. The receiver 504 and the decoder 506 could be configurable, by executing software in a processor-based embodiment for example, to perform these and other operations. Examples of other operations that the receiver 504 and/or the decoder 506 could be configured to perform are described above. The decoder 506, for example, could be further configured to transmit, through the transmitter 508 which enables the UE 500 to transmit signals to network nodes, an indication as to which candidate decoding parameters were used to decode received communication signals. Such an indication could be used by network nodes, and/or a centralized processing system, to track location of the UE 500.

Figure 6:
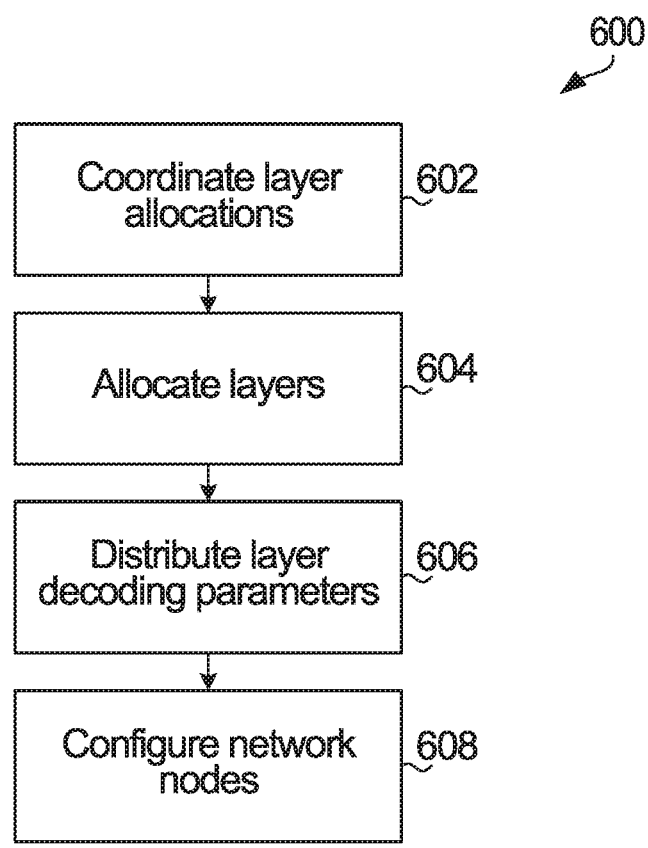
FIG. 6 is a flow diagram of a method according to another embodiment.

FIG. 6 is a flow diagram of a method according to another embodiment. The method 600 is illustrative of a method performed by network equipment. The method 600 could be centralized, and performed in the communication network at a centralized processing system as shown at 120 in FIG. 1, for example. The method 600 could instead be performed in a distributed manner, at multiple network nodes, with the multiple network nodes communicating with each other to determine layer allocations and their own configurations.

Layer allocations are coordinated at 602, by a centralized processing system as shown at 120 in FIG. 1 for example, or by network nodes. The coordination at 602 involves determining how layers should be allocated. Layers could be allocated to UEs or to network nodes as described above. Factors such as any one or more of: the number of layers available for allocation, the number of UEs, the number of network nodes in the network, load balancing, and energy saving could be taken into account in coordinating layer allocations. After a layer allocation has been determined, layers are allocated, to UEs or to network nodes, at 604.

Decoding parameters for decoding communication signals that are associated with different layers are distributed to UEs at 606. At 608, a first subset of network nodes (such as the network nodes 208a, 208b, 208c in FIG. 2 or 308a, 308b, 308c in FIG. 3) are configured to transmit first communication signals that are decodable by the UE using the decoding parameters. A second subset of network nodes (such as the network nodes 208b, 208c, 208d in FIG. 2 or 308b, 308c, 308d in FIG. 3) are also configured to transmit second communication signals that are decodable by the UE using the decoding parameters. A network node could be configured to transmit communication signals that are associated with multiple layers.

In a network node layer allocation embodiment, for example, layers are allocated to network nodes. Configuration of the network nodes of the first subset and the second subset could be performed at the same time at 604.

However, the network nodes of the first and second subsets need not necessarily be configured at the same time. In embodiments in which layers are allocated to UEs, a location of the UE could be tracked and at least a network node in the second subset that will take over responsibility for a particular layer from a network node in the first subset (after the UE moves into the second service area) might not be configured until the UE has moved into or is at least close to entering the second service area. With reference to FIG. 2, for example, the network node 208a could be configured to transmit communication signals associated with the layer 230A when the UE is at the location 204A. The network node 208d, which takes over responsibility for this layer from network node 208a when the UE moves to the location 204B, might be configured to transmit communication signals associated with the layer 230B, in response to detecting movement of the UE from the first service area at the location 204A to the second service area at the location 204B.

FIG. 6 represents an illustrative embodiment. Other embodiments could include additional or different operations, performed in an order that is similar to or different from the order shown in FIG. 6.

For example, a method could involve scheduling transmission of communication signals by the network nodes. Such scheduling could be performed at a centralized processing system in the communication network, or in a distributed manner at each of the network nodes.

A method could also or instead include tracking a location of the UE in the communication network, determining based on a current location of the UE candidate decoding parameters that are to be used by the UE in decoding communication signals received by the UE, and transmitting to the UE information identifying the candidate decoding parameters. Location tracking could involve receiving from the UE an indication as to which decoding parameters were used to decode communication signals that are received by the UE, and tracking a location of the UE in the communication network based on the indication. In some embodiments, other information is also or instead taken into account for location tracking.

Figure 7:
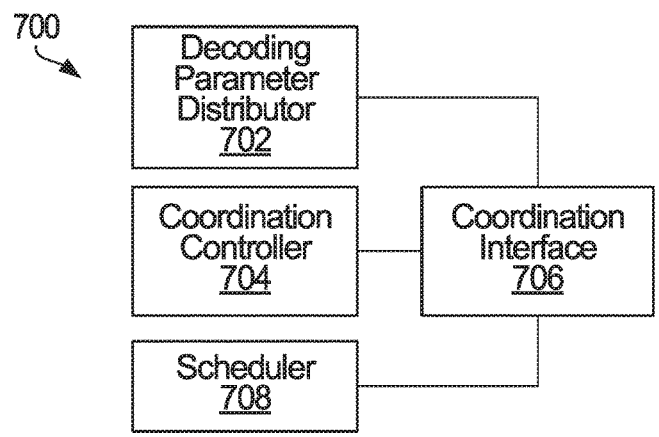
FIG. 7 is a block diagram illustrating a centralized processing system according to an embodiment.

FIG. 7 is a block diagram illustrating a centralized processing system according to an embodiment. The example centralized processing system 700 includes a decoding parameter distributor 702, a coordination controller 704, and a scheduler 708, all operatively coupled to a coordination interface 706. Hardware, firmware, components which execute software, or some combination thereof might be used in implementing at least the decoding parameter distributor 702, the coordination controller 704, and the scheduler 708. The coordination interface 706 includes one or more physical ports or connectors to a communication medium through which the centralized processing system 700 communicates with network nodes. The coordination interface 706 also includes communication circuitry, which could be hardware-, software-, and/or firmware-based, to support communications with the base stations. The form of the coordination interface 706 is dependent upon the communication medium or media and/or protocol(s) to be supported between the centralized processing system 700 and the network nodes.

The decoding parameter distributor 702 is operative to distribute decoding parameters to a UE, as described above with reference to FIG. 6, through the coordination interface 706 and one or more network nodes. Distribution to UEs from the centralized processing system 700 could therefore be indirect, through the coordination interface 706 and network nodes with which the centralized processing system and the UEs communicate.

The coordination controller 704 is operative to configure a first subset of network nodes and a second subset of network nodes in the manner described with reference to 604 in FIG. 6. The coordination controller 704 could be further configured to allocate a layer to a UE and to configure a network node of the first subset to transmit a communication signal associated with the layer, in a UE layer allocation model. The coordination controller 704 could also be configured to detect movement of the UE from the first service area to the second service area, and to configure a network node of the second subset to transmit a communication signal associated with the layer, thereby providing layer transitions between network nodes for UE mobility.

To implement network node layer allocation, the coordination controller 704 could be configured to allocate layers to the network nodes, and to configure network nodes of the first subset and the second subset to transmit communication signals respectively associated with the layers that are allocated to the network nodes.

Scheduling could be centralized as noted above, and the scheduler 708 is configured to schedule transmission of communication signals by the network nodes. A scheduler might not be provided at a centralized processing system in distributed scheduling embodiments.

Figure 8:
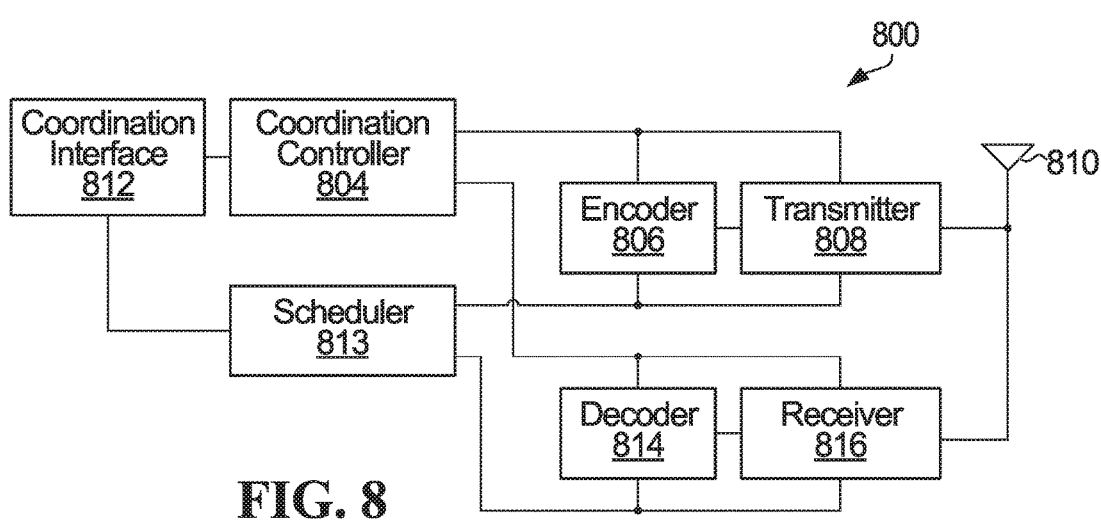
FIG. 8 is a block diagram illustrating a network node according to an embodiment.

Some aspects of coordination between network nodes and/or scheduling could be implemented at the network nodes. FIG. 8 is a block diagram illustrating a network node according to an embodiment. The example network node includes a coordination controller 804, an encoder 806, a transmitter 808, one or more antennas at 810, a coordination interface 812, a scheduler 813, a decoder 814, and a receiver 816, which are operatively coupled together as shown.

Hardware, firmware, components which execute software, or some combination thereof might be used in implementing at least the coordination controller 804, the encoder 806, the transmitter 808, the scheduler 813, the decoder 814, and the receiver 816. The antenna shown at 810 could include separate receive and transmit antennas or sets of antennas, or the same antenna or sets of antennas could be used for both receiving and transmitting communication signals. One or more antennas of any of various types could be provided at 810, and the antenna type(s) could be implementation-specific. The antenna(s) at 810 are compatible with the UE antenna(s) 502 (FIG. 5), to enable communications between the network node 800 and UEs. The coordination interface 812 is similarly compatible with the coordination interface 706 and may be implemented in a similar manner, in embodiments that include a centralized processing system. Network nodes may also or instead communicate with each other, through compatible coordination interfaces 812 at each network node. Communication circuitry in the coordination interface 812 could be hardware-, software-, and/or firmware-based, to support communications with a centralized processing system and/or other network nodes. The form of the coordination interface 812 is dependent upon the communication medium or media and/or protocol(s) to be supported.

The coordination controller 804 could cooperate with the coordination controller 704 (FIG. 7) at a centralized processing system in distributing decoding parameters to UEs and/or in configuring the network node 800. For example, the coordination controller 804 could receive decoding parameters from the coordination controller 704, through the coordination interfaces 706, 812, and control the transmitter 808 to transmit those parameters to a UE. The coordination controller 804 could also or instead receive layer information, such as a codebook to be used by the network node 800, from the coordination controller 704, and configure the encoder 806 and/or the transmitter 808 so that the network node 800 transmits communication signals associated with one or more particular layers. Coordination between network nodes could instead be distributed, with the coordination controllers 804 at the network nodes being configured to communicate with each other to coordinate allocation and distribution of decoding parameters and/or configuration of the network nodes.

Although the network node 800 also includes a scheduler 813, ultimate control of network node scheduling could be centralized. The scheduler 813 could be controlled by the scheduler 708 (FIG. 7) of a centralized processing system, for example. A network node would still be responsible for scheduling traffic at the network node, but the scheduling is centrally controlled. The scheduler 813 at each network node could instead be responsible for its own scheduling, in a distributed scheduling system.

What has been described is merely illustrative of the application of principles of embodiments of the present disclosure. Other arrangements and methods can be implemented by those skilled in the art.

The contents of the drawings are intended solely for illustrative purposes, and the present invention is in no way limited to the particular example embodiments explicitly shown in the drawings and described herein. For example, FIGS. 1 to 3 are a block diagrams of communication networks in which embodiments may be implemented. Other embodiments could be implemented in communication networks that include more network nodes than shown, or that have different topologies than the example shown. Similarly, the example methods in FIGS. 4 and 6, the example UE in FIG. 5, the example centralized processing system in FIG. 7, and the example network node in FIG. 8 are also intended solely for illustrative purposes.

Other implementation details could also vary between different embodiments. Layer-based coordination in a UDN as disclosed herein, for example, could coexist with other transmission schemes. OFDM or code division layers need not only be targeted to mobile UEs, but could be allocated to "cell center" low mobility UEs.

Layer-based coordination as disclosed herein could involve transfer of various types of information between a central processing system, network nodes, and/or UEs. Any of various signaling approaches could be implemented.

Considering UE layer assignment, signaling at a higher level in a protocol stack could be used for initial signature/ codebook allocation and/or updates in semi-static or dynamic systems. MCS signaling could similarly support dynamic or semi-static MCS allocation or assignment. Grant signaling, in embodiments in which scheduling is not blind, could use a Physical Downlink Control CHannel (PDCCH) in LTE-based systems, for example. Feedback for reporting signal strength and/or Channel Quality Indicator (CQI) could be implemented on a per link and/or Time Division Duplex (TDD) basis. Acknowledgement/negative acknowledgement (ACK/NAK) signaling could use a collective ACK or individual ACKs.

For network node codebook allocation, higher-level signaling could be used to distribute a list of possible codebooks and/or other layer-related information. A measurement channel for UE reporting could be direct, indirect, or hybrid. As noted above for UE layer allocation, scheduling in a network node layer allocation system could be blindly detected or included in grant signaling, using a POOCH for grant signaling for example. ACK/NAK signaling could be ACK-based for blind or ACK/NAK for POOCH based grant signaling. Optional feedback signaling for a UE to report a list of decodable layers, for example, could be TDD based or hybrid. Although horizontal and vertical coding are options in a UE layer allocation system, vertical coding is preferred for a network node layer allocation system.

These are illustrative of implementation details could be implemented in conjunction with layer-based multi-point transmission as disclosed herein.

The present disclosure focuses primarily on UE reception and decoding of communication signals. It should be appreciated, however, that UEs may also transmit communication signals to network nodes. Communication signals transmitted by a UE are similarly associated with the layer(s) that are allocated to the UE or to the network node(s) to which the UE is transmitting. For example, the receiver 816 (FIG. 8) at a network node could receive signals from a UE. A signal received from a UE could include an indication as to which decoding parameters were used to decode communication signals that were received by the UE. A received indication could be provided to the coordination controller 804 at the network node, to the coordination controller at one or more other network nodes through the coordination interface 812, and/or to the coordination controller 704 (FIG. 7) at a centralized processing system through the coordination interfaces 812, 706. Any or all of these coordination controllers may then track a location of the UE in the communication network based on the indications.

Different layers may involve different levels of cooperation between network nodes. For example, suppose there are three network nodes to serve a UE in a UE layer allocation embodiment, with only two of the network nodes connected through relatively fast backhaul connections and the third network node being connected through a slower backhaul connection. The network nodes with the faster backhaul connections could use a joint scheduler which dynamically assigns the layers of the UE to the two network nodes. However, any backhaul exchange between the two network nodes and the third network node would be slower, and static or semi-static cooperation and/or layer allocation would be more suitable for the third network node.

In embodiments disclosed herein, service could be considered to be moving with a UE. Cooperation between network nodes may be simplified and may provide seamless service to a UE as the UE moves between different coverage areas of a network.

Embodiments also provide for multi-layer cooperation. Multi-site diversity may improve channel stability and make communication channels less susceptible to channel aging caused by mobility.

In addition, although described primarily in the context of methods and systems, other implementations are also contemplated, as instructions stored on a non-transitory processor-readable medium, for example.

We claim:

1. A method performed by a user equipment (UE), the method comprising:

receiving a first plurality of communication signals from respective network nodes in a first subset of network nodes in a communication network when the UE is located in a first service area of the communication network, each communication signal of the first plurality of communication signals being associated with a respective one of a plurality of communication signal layers in the communication network;

identifying first candidate communication signal layer decoding parameters, from a set of communication signal layer decoding parameters that are available at the UE, for layer-based decoding of the first plurality of communication signals;

applying layer-based decoding to the first plurality of communication signals using the first candidate communication signal layer decoding parameters;

receiving a second plurality of communication signals from respective network nodes in a second subset of the network nodes after receiving the first plurality of communication signals and after the UE is moved from the first service area to a second service area, each communication signal of the second plurality of communication signals being associated with a respective one of the plurality of communication signal layers, the second subset of network nodes comprising at least one network node that is not in the first subset of network nodes;

identifying second candidate communication signal layer decoding parameters, from the set of communication signal layer decoding parameters that are available at the UE, for layer-based decoding of the second plurality of communication signals;

applying layer-based decoding to the received second plurality of communication signals using the second candidate communication signal layer decoding parameters.

2. The method of claim 1, wherein the first and second candidate communication signal layer decoding parameters are the same and the first and second candidate communication signal layer decoding parameters comprise communication signal layer decoding parameters for communication signal layers that are allocated to the UE.

3. The method of claim 1, further comprising:
receiving information identifying the first candidate communication signal layer decoding parameters and information identifying the second candidate communication signal layer decoding parameters.

4. The method of claim 1, wherein the first candidate communication signal layer decoding parameters comprise communication signal layer decoding parameters for communication signal layers that are respectively allocated to the network nodes in the first subset of network nodes and the second candidate communication signal layer decoding parameters comprise communication signal layer decoding parameters for communication signal layers that are respectively allocated to the network nodes in the second subset of network nodes.

5. The method of claim 1, wherein the first and second candidate communication signal layer decoding parameters comprise respective codebooks associated with the plurality of communication signal layers.

6. The method of claim 1, wherein applying layer-based decoding comprises using any one or more of: Successive Interference Cancellation (SIC), Message Passing Algorithm (MPA), joint detection, Maximum Likelihood Detection (MLD), and Multiple Input Multiple Output (MIMO).

7. The method of claim 1, wherein the communication signal layers comprise multiple tiers of layers, wherein applying layer-based decoding comprises applying layer-based decoding to decode one or more communication signals associated with communication signal layers of a first tier before applying layer-based decoding to communication signals associated with communication signal layers of a second tier.

8. The method of claim 1, wherein the communication signal layers comprise respective data streams in any one or more of: an Orthogonal Frequency Division Multiplexing (OFDM) domain, a code domain, and a spatial domain.

9. The method of claim 1, further comprising one or both of:
transmitting to one of the network nodes of the first subset of network nodes an indication of which of the first candidate communication signal layer decoding parameters were used to successfully decode the first plurality of communication signals; and
transmitting to one of the network nodes of the second subset of network nodes an indication of which of the second candidate communication signal layer decoding parameters were used to successfully decode the second plurality of communication signals.

10. A non-transitory processor-readable medium storing instructions which, when executed by one or more processors at a user equipment (UE), cause the processor to perform a method comprising:

receiving a first plurality of communication signals from respective network nodes in a first subset of network nodes in a communication network when the UE is located in a first service area of the communication network, each communication signal of the first plurality of communication signals being associated with a respective one of a plurality of communication signal layers in the communication network;

identifying first candidate communication signal layer decoding parameters, from a set of communication signal layer decoding parameters that are available at the UE, for layer-based decoding of the first plurality of communication signals;

applying layer-based decoding to the first plurality of communication signals using the first candidate communication signal layer decoding parameters;

receiving a second plurality of communication signals from respective network nodes in a second subset of the network nodes after receiving the first plurality of communication signals and after the UE is moved from the first service area to a second service area, each communication signal of the second plurality of communication signals being associated with a respective one of the plurality of communication signal layers, the second subset of network nodes comprising at least one network node that is not in the first subset of network nodes;

identifying second candidate communication signal layer decoding parameters, from the set of communication signal layer decoding parameters that are available at the UE, for layer-based decoding of the second plurality of communication signals;

applying layer-based decoding to the received second plurality of communication signals using the second candidate communication signal layer decoding parameters.

11. A user equipment (UE) comprising:
a receiver to receive a first plurality of communication signals from respective network nodes in a first subset of network nodes in a communication network when the UE is located in a first service area of a communication network, each communication signal of the first plurality of communication signals being associated with a respective one of a plurality of communication signal layers in the communication network;
a signal decoder, coupled to the receiver, to identify first candidate communication signal layer decoding parameters, from a set of communication signal layer decoding parameters that are available at the UE, for layer-based decoding of the first plurality of communication signals, and to apply layer-based decoding to the first plurality of communication signals using the first candidate communication signal layer decoding parameters,
wherein the receiver is further configured to receive a second plurality of communication signals from respective network nodes in a second subset of the network nodes after receiving the first plurality of communication signals and after the UE is moved from the first service area to a second service area of the communication network, each communication signal of the second plurality of communication signals being associated with a respective one of the plurality of communication signal layers, the second subset of network nodes comprising at least one network node that is not in the first subset of network nodes;

wherein the signal decoder is further configured to identify second candidate communication signal layer decoding parameters, from the set of communication signal layer decoding parameters that are available at the UE, for layer-based decoding of the second plurality of communication signals, and to apply layer-based decoding to the received second plurality of communication signals using the second candidate communication signal layer decoding parameters.

12. The UE of claim 11, wherein the first and second candidate communication signal layer decoding parameters are the same and the first and second candidate communication signal layer decoding parameters comprise communication signal layer decoding parameters for communication signal layers that are allocated to the UE.

13. The UE of claim 11,
wherein the signal decoder is further configured to receive information identifying the first candidate communication signal layer decoding parameters and information identifying the second candidate communication signal layer decoding parameters.

14. The UE of claim 11, wherein the first candidate communication signal layer decoding parameters comprise communication signal layer decoding parameters for communication signal layers that are respectively allocated to the network nodes in the first subset of network nodes and the second candidate communication signal layer decoding parameters comprise communication signal layer decoding parameters for communication signal layers that are respectively allocated to the network nodes in the second subset of network nodes.

15. The UE of claim 11, wherein the first and second candidate communication signal layer decoding parameters comprise respective codebooks associated with the communication signal layers.

16. The UE of claim 11, wherein the decoder implements any one or more of: Successive Interference Cancellation (SIC), Message Passing Algorithm (MPA), joint detection, Maximum Likelihood Detection (MLD), and Multiple Input Multiple Output (MIMO).

17. The UE of claim 11, wherein the communication signal layers comprise multiple tiers of layers, wherein the signal decoder is configured to apply layer-based decoding to decode one or more communication signals associated with communication signal layers of a first tier and to then apply layer-based decoding to communication signals associated with communication signal layers of a second tier.

18. The UE of claim 11, wherein the communication signal layers comprise respective data streams in any one or more of: an Orthogonal Frequency Division Multiplexing (OFDM) domain, a code domain, and a spatial domain.

19. The UE of claim 11, further comprising:
a transmitter to transmit signals from the UE to the network nodes,
wherein the signal decoder is coupled to the transmitter and is further configured to transmit, through the transmitter, one or both of:
an indication, to one of the network nodes of the first subset of network nodes, of which of the first candidate communication signal layer decoding parameters were used to successfully decode the first plurality of communication signals, and
an indication, to one of the network nodes of the second subset of network nodes, of which of the second candidate communication signal layer decoding parameters were used to successfully decode the second plurality of communication signals.

* * * * *